US010272749B2

(12) United States Patent
Lee (10) Patent No.: US 10,272,749 B2
(45) Date of Patent: Apr. 30, 2019

(54) TAILGATE FOR VEHICLE AND METHOD FOR MANUFACTURING THE SAME (71) Applicants: Hyundai Motor Company, Seoul (KR); Kia Motors Corporation, Seoul (KR)

(72) Inventor: Ho Sang Lee, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 16 days.

(21) Appl. No.: 15/488,728

(22) Filed: Apr. 17, 2017

(65) Prior Publication Data

US 2018/0154746 A1 Jun. 7, 2018

(30) Foreign Application Priority Data

Dec. 6, 2016 (KR) .................. 10-2016-0164789

(51) Int. Cl.
*B60J 5/10* (2006.01)
*B62D 35/00* (2006.01)
*B29C 65/02* (2006.01)
*B29C 65/48* (2006.01)
*B60Q 1/30* (2006.01)
*B29L 31/30* (2006.01)
*B60J 1/18* (2006.01)

(52) U.S. Cl.
CPC .............. *B60J 5/107* (2013.01); *B29C 65/02* (2013.01); *B29C 65/48* (2013.01); *B60J 5/101* (2013.01); *B60Q 1/30* (2013.01); *B62D 35/007* (2013.01); *B29L 2031/30* (2013.01); *B60J 1/18* (2013.01); *Y02T 10/82* (2013.01)

(58) Field of Classification Search
CPC .... B60J 5/10; B60J 5/102; B60J 5/107; B29C 65/48
USPC ........................................................ 296/50, 56
See application file for complete search history.

(56) References Cited

U.S. PATENT DOCUMENTS

| 8,226,151 | B2* | 7/2012 | Miyake | B60J 5/107 296/106 |
|---|---|---|---|---|
| 8,690,220 | B2* | 4/2014 | Tsukiyama | B62D 35/007 296/106 |
| 8,899,658 | B1* | 12/2014 | Gangal | B60J 5/107 296/146.6 |
| 8,973,968 | B2* | 3/2015 | Crane | B60S 1/0433 296/96.17 |
| 2010/0102589 | A1* | 4/2010 | Miyake | B60J 5/107 296/146.8 |
| 2013/0280452 | A1* | 10/2013 | Nawroth | B60J 5/107 428/35.7 |
| 2016/0176271 | A1* | 6/2016 | Rejc | B22D 21/04 296/146.5 |
| 2018/0056763 | A1* | 3/2018 | Motohashi | B60J 5/107 |
| 2018/0117852 | A1* | 5/2018 | Huotari | B29C 65/72 |

* cited by examiner

Primary Examiner — Jason S Daniels
(74) Attorney, Agent, or Firm — Morgan, Lewis & Bockius LLP

(57) ABSTRACT

A tailgate for vehicle may include a body panel including an internal panel and a reinforcing panel mounted on at least a portion of the internal panel, a cover panel mounted on the body panel by an adhesive to cover a portion of the body panel and having a cover body integrally formed with a spoiler portion, and a lamp device mounted on the cover panel.

14 Claims, 9 Drawing Sheets

FIG. 9

TAILGATE FOR VEHICLE AND METHOD FOR MANUFACTURING THE SAME

CROSS-REFERENCE(S) TO RELATED APPLICATIONS

The present application claims priority to Korean Patent Application No. 10-2016-0164789, the entire contents of which are incorporated herein for all purposes by this reference.

BACKGROUND OF THE INVENTION

Field of the Invention

The present invention relates to a tailgate for a vehicle and method for manufacturing the same with an improved structure.

Description of Related Art

In general, vehicles with large overall height, such as those of the hatchback type, sports utility vehicle (SUV) type, multi-purpose vehicle (MPV) type, or recreational vehicle (RV) type, etc., are equipped with a tailgate at the back to increase utilization of the interior compartment and facilitate luggage loading.

The tailgate may open and close the opening of the loading compartment configured to load items at the back of the vehicle. The tailgate may be pivotally disposed around a horizontal axis at the top of the back of the vehicle, and there may be a handle attached at the bottom of the tailgate to facilitate the closure of the tailgate.

The tailgate may include a spoiler to prevent eddy currents of air forming while the vehicle is moving. The spoiler may improve driving stability by creating a down force on the back of the vehicle while the vehicle is travelling at a high speed.

A conventional spoiler is combined with the back panel of the tailgate through volts and fasteners, which causes a leakage at the combined part.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The present invention is directed to providing a tailgate for a vehicle and method for manufacturing the same to prevent leakage.

The present invention also provides a tailgate for a vehicle and method for manufacturing the same to embody an elegant design.

The present invention also provides a tailgate for a vehicle and method for manufacturing the same to save costs.

The present invention also provides a tailgate for a vehicle and method for manufacturing the same to increase robustness.

The present invention also provides a tailgate for a vehicle and method for manufacturing the same to reduce weight.

In accordance with an aspect of the present invention, a tailgate for a vehicle includes a body panel including an internal panel and a reinforcing panel mounted on at least one portion of the internal panel, a cover panel mounted on the body panel by an adhesive to cover a portion of the body panel and having a cover body integrally formed with a spoiler portion, and a lamp device mounted on the cover panel.

The cover panel may be formed to include at least one of polypropylene and talc.

The cover panel may include at least one reinforcing member disposed on a side of the cover panel facing the body panel.

The reinforcing member(s) may be mounted on the cover panel by at least one of a combining member, an adhesive or welding.

The reinforcing member(s) may include side reinforcing members disposed on both sides of the width of the cover panel, and a center reinforcing member disposed between the side reinforcing members.

The reinforcing member(s) may be formed to include talc.

The adhesive may be formed to include urethane.

The reinforcing panel may be formed to include Steel Plate Cold Commercial (SPCC).

The body panel may include a top panel mounted at the top end portion of the internal panel, a bottom panel mounted at the bottom end portion of the internal panel, a center panel mounted at the internal panel and disposed between the top and bottom panels, and a lamp panel mounted at the internal panel and disposed between the bottom and center panels of the internal panel.

The adhesive may be applied around the cover panel.

In accordance with an aspect of the present invention, a method for manufacturing a tailgate for a vehicle includes preparing a body panel having an internal panel, preparing a cover panel formed to include at least one of polypropylene and talc and having a cover body integrally formed with a spoiler portion, and bonding the cover panel on the body panel with an adhesive.

The method may further include heat-processing a section of the body panel where the cover panel is mounted before bonding the cover panel on the body panel.

The method may further include applying an adhesive around the cover panel before bonding the cover panel on the body panel.

The method may further include mounting a lamp device on the cover panel after bonding the cover panel to the body panel.

Preparing the cover panel may include having at least one reinforcing member mounted on a side of the cover panel facing the body panel.

The methods and apparatuses of the present invention have other features and advantages which will be apparent from or are set forth in more detail in the accompanying drawings, which are incorporated herein, and the following Detailed Description, which together server to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalents parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to limit the present invention. It is to be understood that the singular forms "a," "an," and "the" include plural references unless the context clearly dictates otherwise. It will be further understood that the terms "comprises" and or "comprising," when used in the present specification, specify the presence of stated features, integers, steps, operations, elements, and or components, but do not preclude the presence or addition of one or more other features, integers, steps, operations, elements, components, and or groups thereof.

The terms including ordinal numbers such as "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present invention. Descriptions shall be understood to include any and all combinations of one or more of the associated listed items when the items are described by using the conjunctive term "~ and/or ~," or the like.

A vehicle herein used refers to a machine that transports people, animals, and or cargo from a starting place to a destination. The vehicle may include cars that run on the road or track, ships that travel in an ocean or river, and airplanes that fly in the air with aeromechanics.

The cars that run on the road or track may travel in a desired direction by rotation of at least one wheel, and may include two-wheeled, three-wheeled, or four-wheeled automobiles, cars for construction and machinery, two-wheeled vehicles, motorbikes, or trains that run on a track.

Figure 1:
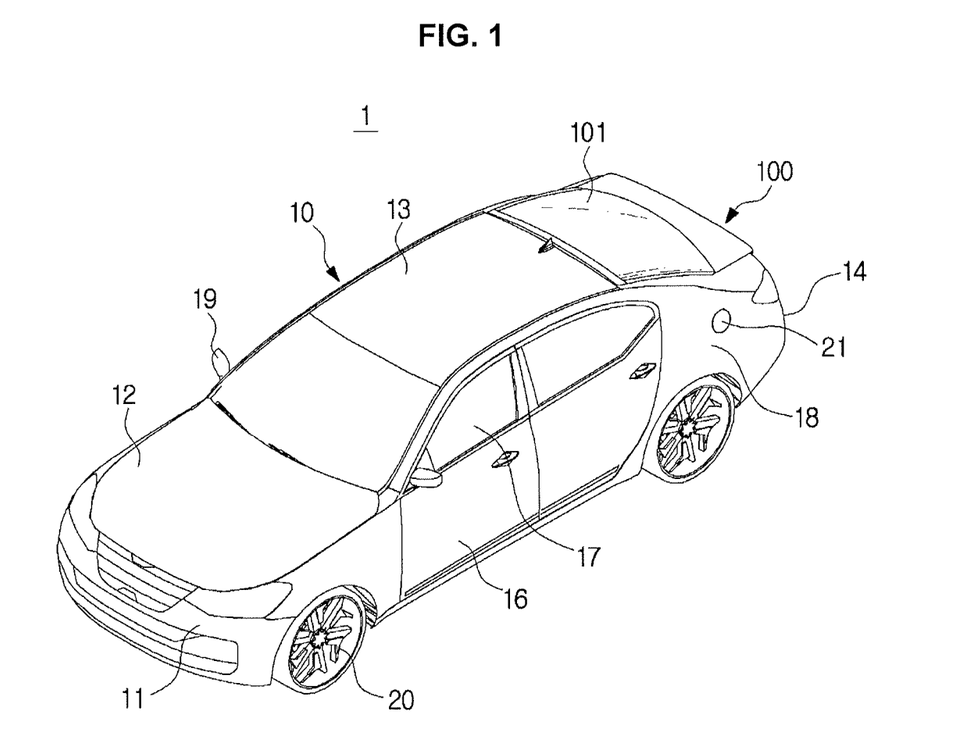
FIG. 1 shows the exterior of a vehicle with a tailgate for a vehicle viewed from the front according to an exemplary embodiment of the present invention.
Figure 2:
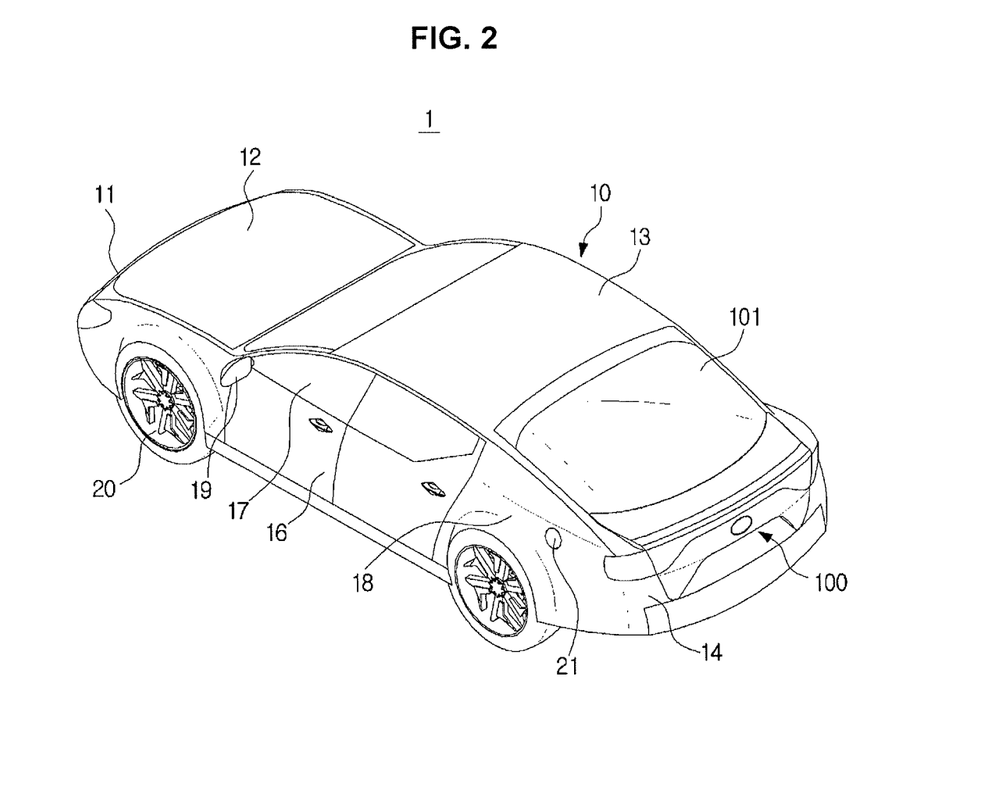
FIG. 2 shows the vehicle shown in FIG. 1 viewed from the back.

FIG. 1 shows the exterior of vehicle 1 with a tailgate 100 for the vehicle viewed from the front according to an exemplary embodiment of the present invention. FIG. 2 shows the vehicle 1 shown in FIG. 1 viewed from the back. Although FIG. 1 and FIG. 2 show the tailgate 100 for vehicle 1 applied to the hatchback type, the tailgate 100 for a vehicle 1 according to an exemplary embodiment of the present invention is not limited thereto, but may be applied to the sports utility vehicle (SUV) type, multi-purpose vehicle (MPV) type, or recreational vehicle (RV) type vehicles. The tailgate 100 for vehicle 1 may also be referred to simply as the tailgate 100.

Referring to FIG. 1 and FIG. 2, the vehicle 1 may include a body with the exterior 10 and the interior, and a chassis on which the remaining parts other than the body, i.e., mechanical devices required for driving are disposed.

The exterior 10 of the body may include a front panel 11, a hood 12, a roof panel 13, a rear panel 14, a tailgate 100, front, back, left and right doors 16, and window glasses 17 disposed in the front, back, left and right doors 116. The vehicle may further include side panels 18. A rear glass 101 may be disposed on the tailgate 100. The tailgate 100 will now be described in detail.

The vehicle 1 may include a fuel door 21 disposed in a section of the side panel 18. The fuel door 21 may be configured to open or close a fuel pipe (not shown) extending from a fuel tank (not shown) placed inside the vehicle 1 for storing fuel to the outside of the vehicle 1.

The exterior 10 of the body may include side mirrors 19 that help the driver see areas behind the vehicle 1.

The chassis of the vehicle 1 may include a power generating system (not shown), a power transferring system (not shown), a traveling mechanism (not shown), a steering system (not shown), a braking system (not shown), a suspension system (not shown), a transmission system (not shown), a fuel system (not shown), and the front, back, left, and right wheels 20.

The vehicle 1 may further include a safety system (not shown) for securing the safety of the driver and passengers. The safety system of the vehicle 1 may include at least one of an airbag control system (not shown) for the purpose of the safety of driver and passengers in case of car crashes, and an Electronic Stability Control (ESC) system (not shown) for stabilizing the vehicle's position while the vehicle 1 is accelerating or cornering.

Moreover, the vehicle 1 may include at least one proximity sensor (not shown) for detecting obstacles or other cars behind or to the side of the vehicle 1, a rain sensor (not shown) for detecting rainfall and precipitation, temperature sensors (not shown) for detecting internal and external temperatures, wheel speed sensors (not shown) for detecting the speed of the front, rear, left and right wheels, an acceleration sensor (not shown) for detecting acceleration, a yaw rate sensor (not shown) for detecting yaw rates, and a gyro sensor (not shown) for detecting the position of the vehicle.

The vehicle 1 may include an electronic control unit (ECU) (not shown) for controlling operation of the power generating system, power transferring system, traveling mechanism, steering system, braking system, suspension system, transmission system, fuel system, and various safety systems and sensors.

Furthermore, the vehicle 1 may include at least one of an air conditioning (AC) and ventilation system (not shown), a lighting system (not shown), a navigation system (not shown), seat heaters (i.e., heated wires (not shown)), a hands-free system (not shown), a Global Positioning System (GPS) system (not shown), an audio system (not shown), a Bluetooth system (not shown), a rear camera (not shown), a charging system (not shown) for an external terminal, and an E-Z pass (hi-pass in Korea) system (not shown), which are disposed for convenience of the driver.

In addition, the vehicle 1 may include at least one of a sunroof open and close system (not shown) for automatically opening or closing the sunroof, a door open and close system (not shown) for automatically opening or closing the front, back, left and right doors 16, and a window open and close system (not shown) for automatically opening or closing the windows.

The vehicle 1 may further include an engine start button (not shown) to provide a command to operate a start motor (not shown). Specifically, the start motor may be activated when the start button is pressed, and the activation of the start motor may cause the power generating system, i.e., engine (not shown) to be operated.

The vehicle 1 may further include a battery (not shown) electrically connected to at least one of the navigation system, audio system, indoor lighting system (not shown), and start motor, configured for supplying power thereto. The battery may be charged using the dynamic power of the internal generator (not shown) or the engine while the vehicle is driven.

Furthermore, the vehicle 1 may include a roof rack (not shown) disposed on the top of the roof panel 13 to load the luggage. The roof rack may extend along the front to back direction or left to right direction on the top of the roof panel 13. The roof rack may be disposed on either side across the width of the roof panel 13 of the vehicle 1, or on the front and or back across the length of the vehicle 1.

Figure 3:
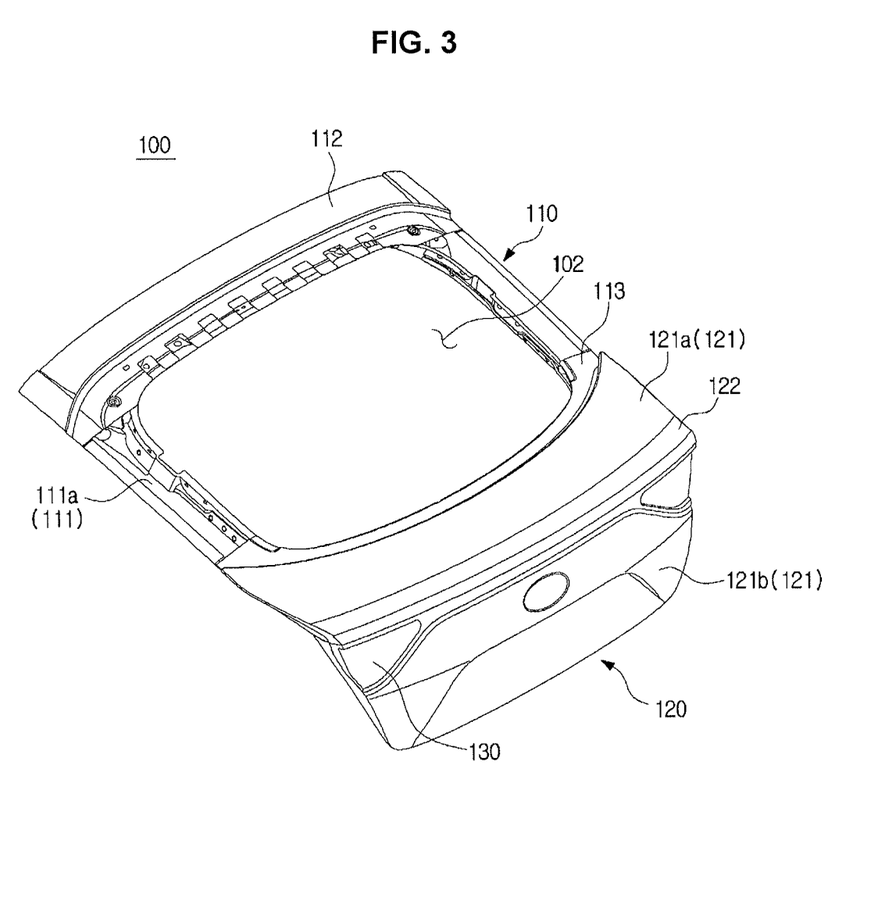
FIG. 3 shows a tailgate for the vehicle shown in FIG. 2.
Figure 4:
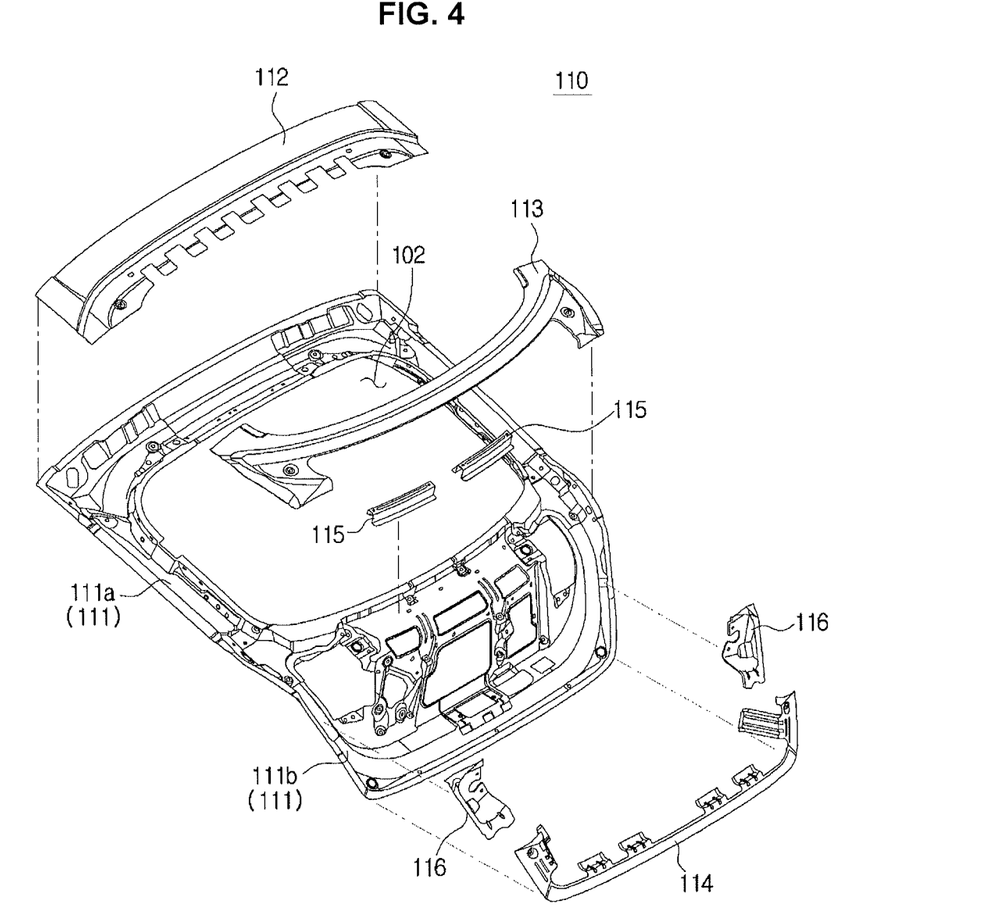
FIG. 4 is an exploded view of a body panel shown in FIG. 3.
Figure 5:
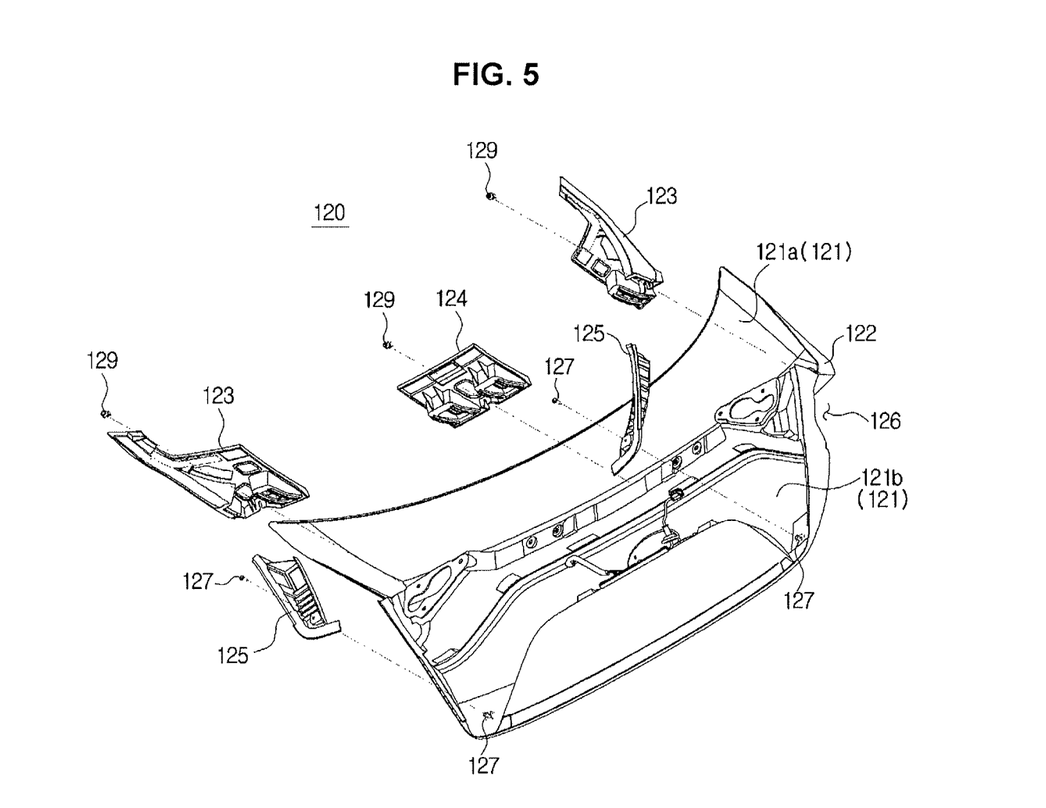
FIG. 5 is an exploded view of a cover panel shown in FIG. 3.
Figure 6:
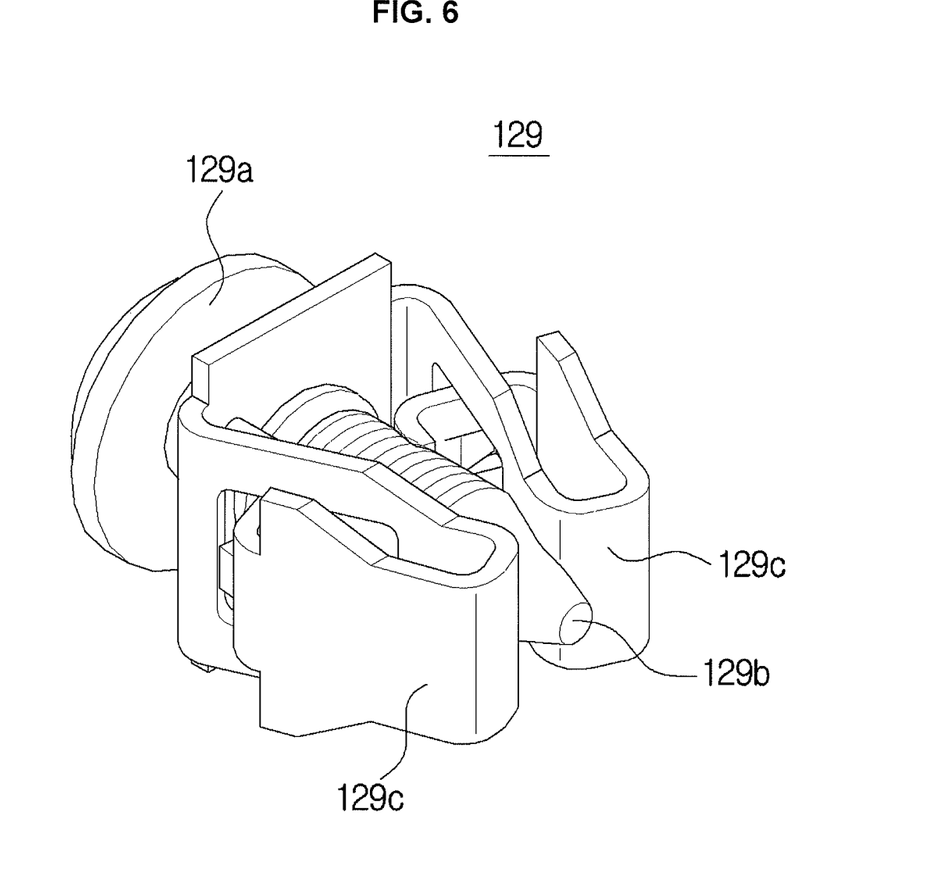
FIG. 6 shows a combining member shown in FIG. 5.
Figure 7:
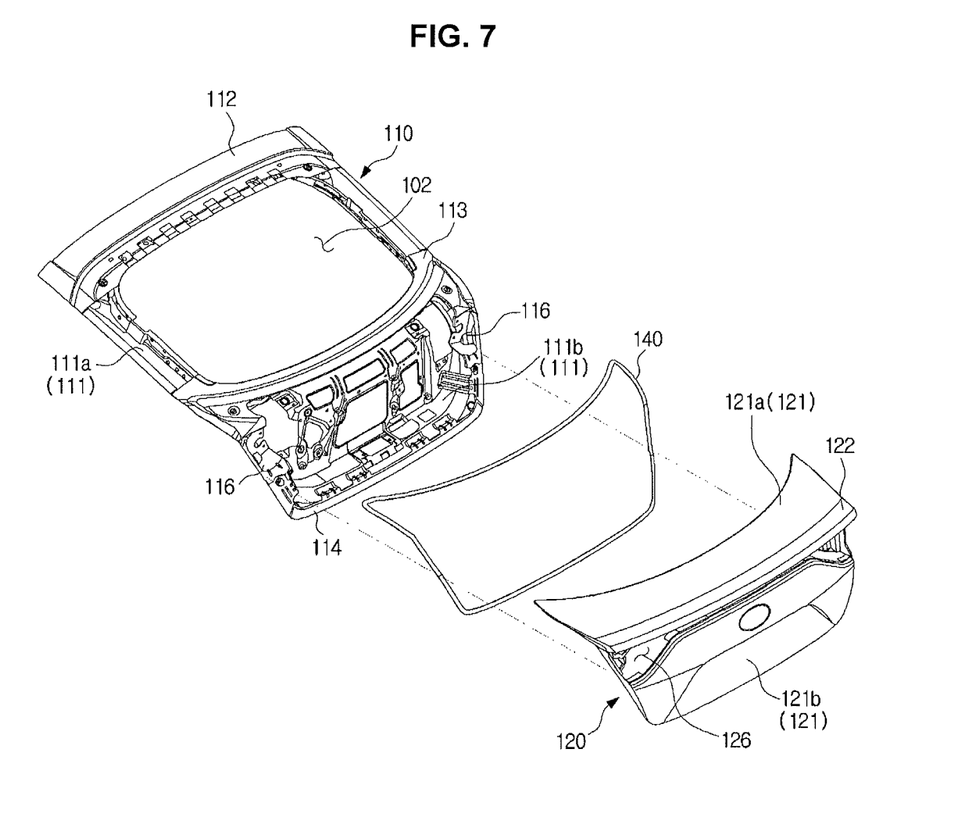
FIG. 7 shows combining the cover panel to the body panel shown in FIG. 3.
Figure 8:
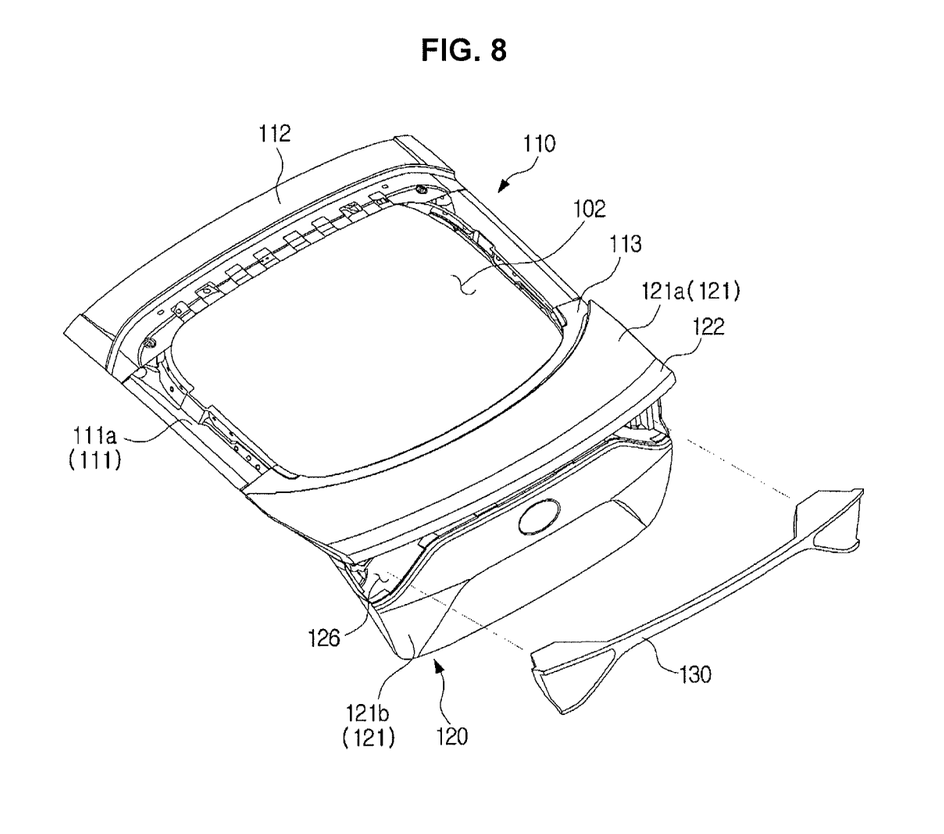
FIG. 8 shows combining a lamp device to the cover panel shown in FIG. 3.

FIG. 3 shows the tailgate 100 for the vehicle shown in FIG. 2. FIG. 4 is an exploded view of a body panel 110 shown in FIG. 3. FIG. 5 is an exploded view of a cover panel 120 shown in FIG. 3. FIG. 6 shows a combining member 129 shown in FIG. 5. FIG. 7 shows combining the cover panel 120 to the body panel 110 shown in FIG. 3. FIG. 8 shows combining a lamp device 130 to the cover panel 120 shown in FIG. 3.

Referring to FIG. 3, the tailgate 100 for a vehicle in accordance with an exemplary embodiment of the present invention may be disposed at the back of the vehicle 1. Specifically, the tailgate 100 for a vehicle may be pivotally combined at the back of the roof panel 13. The tailgate 100 may include a body panel 110, a cover panel 120, and a lamp device 130.

The body panel 110 may include an internal panel 111 provided as a base of the tailgate 100, and a plurality of panels 112, 113, 114, 115, and 116 on which a section of the outer side of the internal panel 111 is mounted.

Referring to FIG. 4, the internal panel 111 may include a first part 111a forming the opening 102 for the rear glass 101 to be mounted therein, and a second part 111b forming the rear side of the vehicle 1. The second part 111b may bend and extend almost downward from the first part 111a. The internal panel 111 may be formed to include steel to secure robustness of the tailgate 100.

The top panel 112 may be mounted at the top end portion of the first part 111a of the internal panel 111. The top panel 112 may cover a section of the top end portion of the outer side of the internal panel 111. The top panel 112 may be formed to include steel to secure robustness of the tailgate 100.

The center panel 113 may be mounted in a section where the first and second parts 111a and 111b join together. The center panel 113 may be placed between the top panel 112 and the bottom panel 114 as will be described below. The center panel 113 may cover a section of almost the center section of the outer side of the internal panel 111. The center panel 113 may be formed to include steel to secure robustness of the tailgate 100.

The rear glass 101 of the vehicle 1 may be fixed in the internal panel 111 while having the top end portion safely disposed in the top panel 112 and the bottom end portion safely disposed in the center panel 113.

The bottom panel 114 may be mounted at the bottom end portion of the second part 111b of the internal panel 111. The bottom panel 114 may cover a section of the bottom end portion of the outer side of the internal panel 111. The bottom panel 114 may be formed to include steel to secure robustness of the tailgate 100.

Reinforcing panels 115 may be mounted in the section where the first and second parts 111a and 111b join together. The reinforcing panel 115 may be mounted in a bending section of the internal panel 111. The reinforcing panel 115 may be disposed in the bottom of the center panel 113 for supporting the center panel 113. Accordingly, the tailgate 100 in accordance with an exemplary embodiment of the present invention may have more increased robustness. The reinforcing panel 115 may be formed to have SPCC.

Although FIG. 4 shows two reinforcing panels 115, the number of the reinforcing panels 115 is not limited thereto, and there may be a single reinforcing panel extending long in the left to right direction or there may be three or more reinforcing panels.

A lamp panel 116 may be mounted at the top end portion of the second part 111b of the internal panel 111. The lamp panel 116 may be disposed between the center panel 113 and the bottom panel 114. The lamp panel 116 may be disposed to accommodate a lamp receiver 126 of the cover panel 120, as will be described below. The lamp panel 116 may be disposed on both sides of the second part 111b.

The aforementioned top panel 112, center panel 113, bottom panel 114, reinforcing panel 115, and lamp panel 116 may be mounted on the internal panel 111 by at least one of welding, adhesion, and screwing.

Referring to FIG. 5, the cover panel 120 may be mounted on the body panel 110 with an adhesive 140 and may include a cover body 121 having a spoiler portion 122. The cover panel 120 may be arranged to cover the second part 111b and a section of the bottom end portion of the first part 111a of the body panel 110.

The cover body 121 may include a first cover part 121a disposed to cover the bottom end portion of the first part 111a of the body panel 110, and a second cover part 121b disposed to cover the second part 111b of the body panel 110. The second cover part 121b may bend and extend almost downward from the first cover part 121a to correspond to the second part 111b of the body panel 110.

The cover body 121 may be integrally formed with the spoiler portion 122. The spoiler portion 122 may be disposed in a section where the first and second cover parts 121a and 121b join. The spoiler portion 122 may extend from where the cover body 121 bends. The cover body 121 may be injection-molded to have the spoiler portion 122.

The cover body 121 may be formed to include polypropylene and or talc. the cover body 121 may be formed to include approximately 30% of talc. The cover body 121 may be formed of plastics. Accordingly, the tailgate 100 in accordance with an exemplary embodiment of the present invention may weigh less and cost less than in the conventional case where steel is used for the tailgate. In addition, the tailgate 100 in accordance with an exemplary embodiment of the present invention may form the cover body 121 with plastics with better machinability, thereby embodying an elegant design.

The cover body 121 may include a lamp receiver 126 configured for the lamp device 130 to be received therein. The lamp receiver 126 may extend along the left and right direction. The lamp receiver 126 may have a shape corresponding to the shape of the lamp device 130.

The cover panel 120 may include reinforcing members 123, 124, 125 mounted on the internal side toward the body panel 110. Specifically, the cover panel 120 may include side reinforcing members 123 and 125 disposed on either end portions of the width of the cover panel 120, and a center reinforcing member 124 disposed between the side reinforcing members 123 and 125.

The side reinforcing members 123 and 125 may include first side reinforcing members 123 mounted on the left and right sides of the internal side of the cover body 121 to reinforce the left and right sides of the first cover part 121a of the cover body 121, and second side reinforcing members 125 mounted on the left and right sides of the internal side of the cover body 121 to reinforce the left and right sides of the second cover part 121b of the cover body 121. The first and second side reinforcing members 123 and 125 may support the cover body 121 from the inside of the cover body 121, thereby preventing the cover body 121 from being twisted and or bent.

The side reinforcing members 123 and 125 may be formed to include polypropylene and or talc. Specifically, the side reinforcing members 123 and 125 may be formed to include approximately 30% of talc. The side reinforcing members 123 and 125 may be formed of plastics. Accordingly, the tailgate 100 in accordance with an exemplary embodiment of the present invention may weigh less and cost less than in the conventional case where steel is used for the tailgate.

The center reinforcing member 124 may be mounted in the center section of the internal side of the cover body 121 to reinforce the center section of the first cover part 121a of the cover body 121. The center reinforcing member 124 may support the cover body 121 from the inside of the cover body 121, thereby preventing the cover body 121 from being twisted and or bent.

The center reinforcing member 124 may be formed to include polypropylene and or talc. Specifically, the center reinforcing member 124 may be formed to include approximately 30% of talc. The center reinforcing member 124 may be formed of plastics. Accordingly, the tailgate 100 in accordance with an exemplary embodiment of the present invention may weigh less and cost less than in the conventional case where steel is used for the tailgate.

Although the embodiment describes that the reinforcing members 123, 124, 125 are disposed on the left and right sides of the internal side of the first cover part 121a, the center section, and the left and right sides of the second cover part 121b, the number and positions of the reinforcing members 123, 124, 125 are not limited thereto, but may be changed as needed.

The reinforcing members 123, 124, 125 may be mounted on the cover body 121 by one of the combining member 129, adhesion, and welding.

referring to FIG. 6, the combining member 129 which mounts reinforcing members 123, 124, 125 on the cover body 121 may include a head 129a, a body 129b, and a fixer 129c. The reinforcing members 123, 124, 125 may be mounted on the cover body 121 as the bodies 129b of the combining members 129 are combined into combining holes 127 and fixed by the fixers 129c.

Referring to FIG. 7, the cover panel 120 may be mounted on the body panel 110 with an adhesive 140. The adhesive 140 may be formed to include urethane. The adhesive 140 may be disposed around the cover panel 120. As the cover panel 120 is mounted on the body panel 110 by the adhesive 140, the tailgate 100 for a vehicle in accordance with the embodiment of the present invention may have improved ease of assembly and prevent leakage.

Referring to FIG. 8, the lamp device 130 may be mounted on the cover panel 120. the lamp device 130 may be mounted in the lamp receiver 126 disposed in the cover body 121. The lamp device 130 may be a rear lamp of the vehicle 1. The lamp device 130 may be mounted on the cover panel 120 by at least one of adhesion, welding, and screwing.

Figure 9:
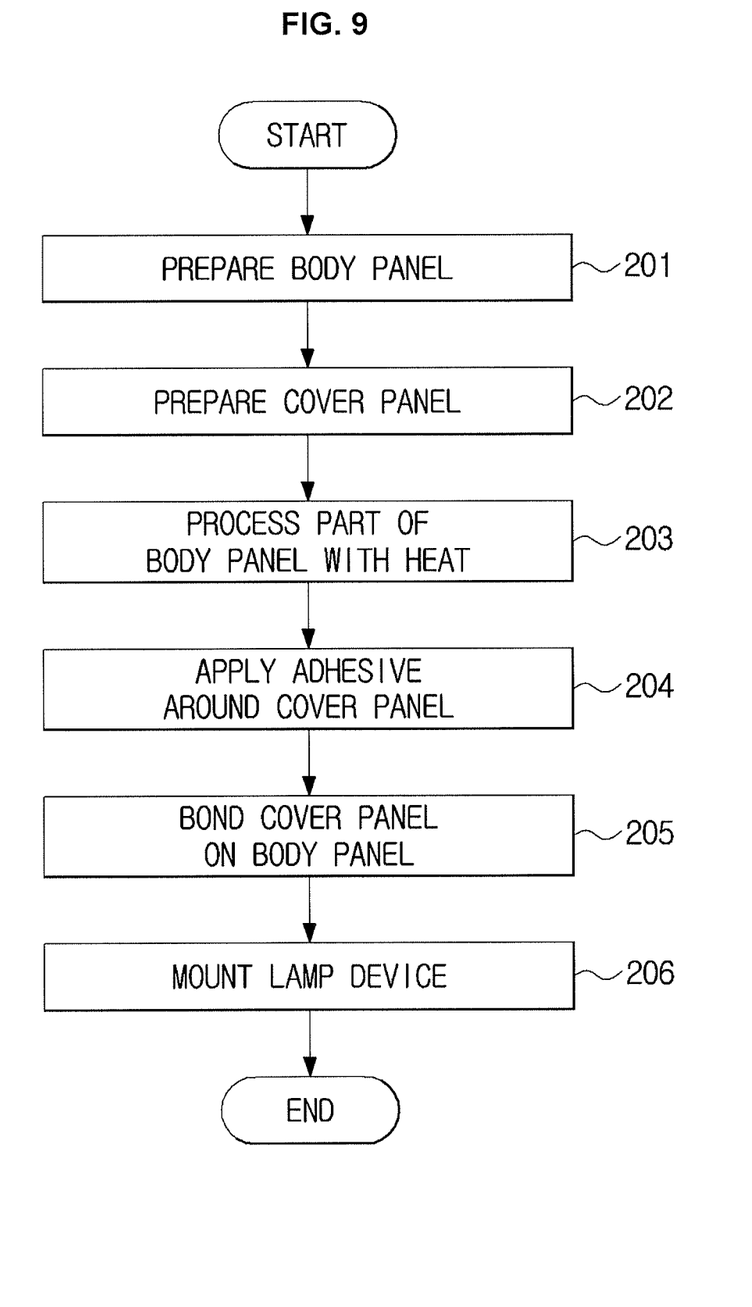
FIG. 9 is a flowchart illustrating a method for manufacturing the tailgate for the vehicle shown in FIG. 3.

FIG. 9 is a flowchart illustrating a method for manufacturing the tailgate 100 for a vehicle shown in FIG. 3.

Referring to FIG. 9, a method for manufacturing the tailgate 100 for a vehicle in accordance with an exemplary embodiment of the present invention will now be described.

First, the body panel 110 is prepared, in step 201. The step of preparing the body panel 110 may include having the top panel 112, center panel 113, bottom panel 114, reinforcing panel 115, and lamp panel 116 attached to the internal panel 111 by welding.

Subsequently, the cover panel 120 is prepared, in step 202. The step of preparing the cover panel 120 may include having the side reinforcing members 123, 125 and the center reinforcing member 124 mounted on the cover body 121 by the combining member 129 and the adhesive 140. The cover body 121 may be integrally injection-molded to have the spoiler portion 122.

Subsequently, a part of the body panel 110 to be mounted on the cover panel 120 may be processed with heat, in step 203.

Then, the adhesive 140 may be applied on the cover panel 120, in step 204. In the present regard, the adhesive 140 may be applied around the cover body 121.

The cover panel 120 may then be bonded to the body panel 110, in step 205. Since the body panel 110 has a section where the cover panel 120 is mounted processed with heat, the cover panel 120 may be thermally bonded to the body panel 110 with the adhesive 140.

The lamp device 130 may then be mounted on the cover panel 120, in step 206. The lamp device 130 may be mounted in the lamp receiver 126 of the cover panel 120 by screwing.

With the above configuration, the tailgate 100 for a vehicle in accordance with the embodiments of the present invention has the cover panel 120 formed of plastics, thereby embodying an elegant design, reducing weight, and saving costs. Furthermore, since the cover panel 120 is mounted on the body panel 110 with the adhesive 140, leakage may be prevented. In addition, robustness of the tailgate 100 may be improved by applying the plurality of reinforcing members 123, 124, 125.

According to embodiments of the present invention, a tailgate and method for manufacturing the same integrates a spoiler and a back panel and attaches the integrated one to a main panel with an adhesive, thereby preventing leakage.

According to embodiments of the present invention, a tailgate and method for manufacturing the same integrates a spoiler and a back panel into one device with a synthetic resin, thereby embodying an elegant design.

According to embodiments of the present invention, a tailgate and method for manufacturing the same integrates a spoiler and a back panel into one device with a synthetic resin, thereby saving costs.

According to embodiments of the present invention, a tailgate and method for manufacturing the same may increase robustness with reinforcing members.

According to embodiments of the present invention, a tailgate and method for manufacturing the same integrates a spoiler and a back panel into one device with a synthetic resin, thereby reducing weight.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tailgate for a vehicle comprising:
    a body panel including an internal panel and a reinforcing panel mounted on at least a portion of the internal panel;
    a cover panel mounted on the body panel by an adhesive to cover a portion of the body panel and having a cover body integrally formed with a spoiler portion; and
    a lamp device mounted on the cover panel,
    wherein the body panel comprises:
        a top panel mounted at a top end portion of the internal panel;
        a bottom panel mounted at a bottom end portion of the internal panel;
        a center panel mounted at the internal panel, and disposed between the top and bottom panels; and
        a lamp panel mounted at the internal panel, and disposed between the bottom and center panels of the internal panel.

2. The tailgate for the vehicle of claim 1 comprising:
    wherein the cover panel is configured to include of polypropylene and talc.

3. The tailgate for the vehicle of claim 1, wherein the cover panel comprises at least one reinforcing member arranged on a side of the cover panel facing the body panel.

4. The tailgate for the vehicle of claim 3, wherein the at least one reinforcing member is mounted on the cover panel by at least one of a combining member, an adhesive or welding.

5. The tailgate for the vehicle of claim 3, wherein the at least one reinforcing member comprises:
    side reinforcing members arranged on a first side and a second side having a width of the cover panel; and
    a center reinforcing member positioned between the side reinforcing members.

6. The tailgate for the vehicle of claim 3, wherein the at least one reinforcing member is formed to include talc.

7. The tailgate for the vehicle of claim 1, wherein the adhesive is configured to include urethane.

8. The tailgate for the vehicle of claim 1, wherein the reinforcing panel is configured to include Steel Plate Cold Commercial (SPCC).

9. The tailgate for the vehicle of claim 1, wherein the adhesive is applied around the cover panel.

10. A method for manufacturing a tailgate for a vehicle, the method comprising:
    preparing a body panel having an internal panel;
    attaching a top panel, a center panel, a bottom panel, and a lamp panel to the internal panel;
    preparing a cover panel formed to include both of polypropylene and talc and having a cover body integrally formed with a spoiler portion; and
    bonding the cover panel on the body panel with an adhesive.

11. The method of claim 10, further comprising:
    heat-processing a part of the body panel where the cover panel is mounted, before bonding the cover panel on the body panel.

12. The method of claim 10, further comprising: applying the adhesive around the cover panel before bonding the cover panel on the body panel.

13. The method of claim 10, further comprising: having a lamp device mounted on the cover panel after bonding the cover panel on the body panel.

14. The method of claim 10, wherein preparing the cover panel comprises having at least one reinforcing member mounted on a side of the cover panel facing the body panel.

* * * * *